Patented Apr. 11, 1939

2,153,804

UNITED STATES PATENT OFFICE 2,153,804

NONSTAINING ANTIOXIDANTS

Paul C. Jones, Akron, Ohio, assignor to The B. F. Goodrich Company, New York, N. Y., a corporation of New York No Drawing. Application April 24, 1936, Serial No. 76,203

6 Claims. (Cl. 18—50)

This invention relates to the art of rubber manufacture and has as its chief object the provision of a new class of antioxidants which are extremely effective in retarding its deterioration but which do not discolor the rubber.

The new class of antioxidants may be designated as carboxy-alkyl-aminophenols and includes such compounds as hydroxy-phenyl glycine (ortho, meta or para), hydroxy tolyl glycine, hydroxy-xenyl glycine, hydroxy-naphthyl glycine, N-hydroxyphenyl alpha-phenylglycine, hydroxy-phenyl beta-amino propionic acid, hydroxy-phenyl gamma-amino butyric acid, hydroxy-phenyl aminostearic acid, N-hydroxyphenyl alanine, N-hydroxyphenyl phenyl-alanine, hdroxy-phenyl leucine, hydroxy-phenyl alpha-dimethyl glycine and the like. Any one of these compounds or a mixture of any one with other antioxidants of the same or a different class is extremely effective in retarding the deterioration of rubber.

When the slight acidity of the carboxy-alkyl-aminophenols is not objectionable, it is generally preferred to employ them alone. In some cases their acidity may even serve the desirable purpose of reducing the rate of vulcanization at low temperatures and therefore of preventing scorching or prevulcanization. In other cases it will be preferred to react the antioxidant with a base to form a salt, or at least to use it together with a sufficient quantity of a base to neutralize its acidity. In some cases it is convenient to use one of the well known basic organic accelerators of vulcanization for this purpose.

As a specific example of one embodiment of the invention a white rubber composition is prepared by mixing 100 parts by weight of pale crepe rubber, 25 parts of zinc oxide, 3 parts of sulphur, 0.9 part of mercaptobenzothiazole, 0.1 part of tetramethyl thiuramdisulphide, and 1 part of p-hydroxy phenyl glycine. The composition is vulcanized in a mold for 30 minutes at 260° F. to give an optimum cure. The vulcanized rubber deteriorates in strength on accelerated aging in an oxygen bomb less than a third as rapidly as the same composition without the p-hydroxy phenyl glycine. Furthermore, it does not discolor even when exposed to strong sunlight.

Although the antioxidants of this invention are peculiarly useful in white or light colored rubber because of their ability to retard deterioration without danger of discoloration, they may obviously be used also to retard the deterioration of dark colored rubber compositions, or of compositions consisting of or containing unvulcanized rubber, gutta percha, balata, artificial rubber isomers, synthetic rubber or synthetic rubber-like materials, and the like. It is accordingly to be understood that the term "rubber" is employed in the claims in a generic sense to include all such rubber-like materials; and that unless otherwise limited the claims in calling for the antioxidants of this invention cover the antioxidants whether used alone or together with other materials such as those referred to above.

I claim:

1. The method of retarding the deterioration of rubber which comprises treating rubber with an alpha hydroxyphenylamino fatty acid.

2. The method of retarding the deterioration of rubber which comprises treating rubber with a hydroxyphenylglycine.

3. The method of retarding the deterioration of rubber which comprises treating rubber with p-hydroxyphenylglycine.

4. A rubber composition comprising rubber and an alpha hydroxyphenylamino fatty acid.

5. A rubber composition comprising rubber and a hydroxyphenylglycine.

6. A rubber composition comprising rubber and p-hydroxyphenylglycine.

PAUL C. JONES.